United States Patent [19]

Hawrylko

[11] Patent Number: 4,684,668
[45] Date of Patent: Aug. 4, 1987

[54] PROCESS FOR PRODUCING POROUS SPHERICAL POLYVINYL CHLORIDE PARTICLES

[75] Inventor: Roman B. Hawrylko, North Olmstead, Ohio

[73] Assignee: The B. F. Goodrich Company, Akron, Ohio

[21] Appl. No.: 12,761

[22] Filed: Feb. 6, 1987

Related U.S. Application Data

[62] Division of Ser. No. 846,163, Mar. 31, 1986, Pat. No. 4,668,707.

[51] Int. Cl.$^4$ .............................................. C08J 9/00
[52] U.S. Cl. ...................................... 521/56; 521/65; 521/146; 526/201; 526/209; 526/344; 526/344.2; 526/344.3
[58] Field of Search ................. 521/56, 145; 526/201, 526/209, 344, 344.2, 344.3

[56] References Cited

U.S. PATENT DOCUMENTS

| 3,620,988 | 11/1971 | Cohen | 524/827 |
| 3,706,722 | 12/1972 | Nelson et al. | 526/225 |
| 4,229,547 | 10/1980 | Cohen et al. | 526/201 |
| 4,360,651 | 11/1982 | Dinbergs | 526/202 |
| 4,435,524 | 3/1984 | Dinbergs | 526/209 |
| 4,458,057 | 7/1984 | Baser | 526/202 |
| 4,603,151 | 7/1986 | Dinbergs | 521/56 |

Primary Examiner—Morton Foelak
Attorney, Agent, or Firm—Joe A. Powell; Alan A. Csontos

[57] ABSTRACT

An improved process is provided for producing porous PVC resin particles by a thickened aqueous suspension polymerization process comprising polymerizing vinyl chloride monomer in an aqueous suspension wherein said aqueous medium contains at least one dispersant capable of thickening water, and optionally at least one secondary surfactant, at least one oil-soluble free radical generating catalyst, the improvement comprising charging said free radical catalyst as a solution wherein the solvent for said catalyst solution has a density equal to or less than that of the monomer being polymerized and the catalyst solution has a density less than water.

11 Claims, No Drawings

PROCESS FOR PRODUCING POROUS SPHERICAL POLYVINYL CHLORIDE PARTICLES

This is a division of application U.S. patent application Ser. No. 06/846,163, filed Mar. 31, 1986, now U.S. Pat. No. 4,668,707.

BACKGROUND OF THE INVENTION

Polyvinyl chloride (PVC) polymers are used in large volumes throughout the world to make various end use products. These polyvinyl chloride resins are normally produced and sold in the form of a free flowing powder made up of individual resin particles. The resin particles are then extruded or calendered into various shapes to form useful products such as pipe and house siding.

An important feature of the resin in extrusion operations is the shape of the resin particle. Assuming a constant particle size and porosity, the more spherical the shape of the resin particle the faster the extrusion rate. Also, a spherical shaped particle will give higher bulk density which results in savings in shipping costs. The higher the bulk density, the more pounds can be loaded into the same volume railcar. Current commercial resins vary in shape from a highly irregular shape resembling "popcorn" to irregular eliptical shapes resembling a distorted "egg".

Producers of polyvinyl chloride have long sought to produce a spherical shape particle. This desirable goal has been attempted in the past, with various degrees of success. One of the problems encountered was what is referred to in the art as excess "fines". In a suspension grade PVC, "fines" are defined as particles which are less than 52 micron in particle size. These fines tend to plug screens in drying equipment and they create dust because of their small size.

Another problem encountered in making spherical PVC particles is the lack of porosity of the resin. Porosity is needed to allow the resin to absorb plasticizers in end use applications.

The thickened aqueous suspension process used before this invention to make spherical PVC particles also results in increased polymer scale buildup on the internal surfaces of the polymerization vessel.

It is believed that the problems of excess "fines", increased polymer scale buildup, and low porosity are caused by the catalyst and secondary dispersants going to the water phase of the thickened reaction medium, rather than remaining in the vinyl monomer phase. In a charge procedure used heretofore, the water containing the thickening dispersant is charged to the reactor and then the vinyl monomer is added. The monomer being lighter will float on top of the water layer. The catalyst and secondary dispersants are then added to the reactor. Being heavier than the vinyl, these materials sink through the vinyl layer and go to the water layer.

U.S. Pat. Nos. 3,620,988; 3,706,722; 4,229,547; 4,360,651; 4,458,057; and 4,435,524 all relate to producing PVC resin having spherical shaped particles. Copending U.S. patent application Ser. No. 707,634 filed March 4, 1985, now U.S. Pat. No. 4,620,629, teaches a method to produce spherical PVC particles having a low glassy particle content.

It is a long sought after and desirable goal of the polyvinyl chloride industry to have a resin with spherical shaped particles and which also has low fines, good porosity and reduced polymer buildup on the internal surfaces of the polymerization reactor.

SUMMARY OF THE INVENTION

It is an object of this invention to provide a process which produces spherical PVC resin particles whereby the process creates less amounts of fines. Fines being defined as particles less than 52 micron in size.

It is another object of this invention to provide a process which produces spherical PVC resin particles which have adequate porosity.

It is still a further objective of this invention to reduce polymer buildup on the internal surfaces of polymerization reactors which are used to make spherical PVC resin particles.

These and other objectives which will become evident from the description of the invention contained herein, are accomplished by an improved method of charging the catalyst and optionally the secondary dispersants to the polymerization mixture.

An improved process is provided for producing porous PVC resin particles by a thickened aqueous suspension polymerization process comprising polymerizing vinyl chloride monomer in an aqueous suspension wherein said aqueous medium contains at least one dispersant capable of thickening water, and optionally at least one secondary surfactant, at least one oil-soluble free radical generating catalyst, the improvement comprising charging said free radical catalyst as a solution wherein the solvent for said catalyst solution has a density equal to or less than that of the monomer being polymerized and the catalyst solution has a density less than water.

DETAILED DESCRIPTION

Polyvinyl chloride resin as used in this specification means polyvinyl chloride homopolymers as well as vinyl chloride polymerized with up to 50%, preferably up to 20%, by weight of one or more other vinylidene monomers having at least one terminal $CH_2=C<$-grouping. Suitable comonomers that may be polymerized with vinyl chloride are esters of acrylic acid, for example, methyl acrylate, ethyl acrylate, butyl acrylate, octyl acrylate, cyanoethyl acrylate, and the like; vinyl acetate; esters of methacrylic acid, such as methyl methacrylate, ethyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art. The amount of comonomer that can be polymerized with vinyl chloride is a function of the choice of comonomer, as is well understood by those skilled in the art. Preferably, the polyvinyl chloride polymers of this invention are polyvinyl chloride homopolymers.

One suitable method of preparing polyvinyl chloride resin by the thickened aqueous suspension process is according to a polymerization process such as is disclosed in U.S. Pat. No. 4,435,524, which is incorporated herein by reference.

The process of U.S. Pat. No. 4,435,524 embodies a suspension polymerization procedure wherein the reaction medium is stirred rapidly during the entire reaction period. With the proper choice of dispersants and surfactants, there is produced spherical, porous particles of polymer having low amounts of glassy content and having high bulk density. In the process, water is the polymerization medium and a vinyl monomer to water ratio in the range of about 1.0 to 10.0 is satisfactory. Preferably a ratio in the range of about 1.0 to 4.0 is employed. This invention will be described in detail as it is employed to produce spherical PVC particles. It is understood that the invention is also applicable to non-spherical PVC particles.

An important feature of the procedure to prepare resin in the form of spherical particles is the colloidal stabilization, or dispersant system, that is employed in the polymerization reaction for the purpose of stabilizing the dispersed monomer droplets against coalescence. An important component of this process is a dispersant which will thicken water. Examples of such thickeners and how they are used are disclosed in U.S. Pat. No. 3,620,988, incorporated herein by reference. The dispersants which will thicken water are usually high molecular weight dispersants or crosslinked dispersants which will thicken water at concentrations of less than 2% in water, preferably less than 0.2%, and more preferably less than 0.1% concentration in water. The thickening dispersant should thicken the aqueous reaction medium to a Brookfield viscosity of at least 50 centipoises, as measured at 20° C. Suitable thickening dispersants include crosslinked polyacrylic acid polymer, crosslinked ethylene malic anhydride polymer, high molecular weight polyvinyl alcohols, high molecular weight cellulose polymers, natural thickeners such as gums and the like. The invention will be explained in connection with a substantially unneutralized crosslinked interpolymer.

A suitable thickener is a substantially unneutralized crosslinked interpolymer of one or more carboxylic acid monomers with a polyunsaturated compound having a plurality of terminally unsaturated polymerizable groups, for example, a crosslinked polyacrylic acid polymer. The crosslinking is necessary since an uncrosslinked polyacrylic acid polymer will produce a highly agglomerated charge, which will result in non-spherical resin. The crosslinking is also responsible for making the polyacrylic acid polymer incapable of forming a true solution in water. In this regard, these polyacrylic acid polymers are classified as being substantially insoluble in water. Nevertheless, the structure of the interpolymer must be such that it has enough affinity for water to swell appreciably in an aqueous medium, thus thickening the water phase, but not to the extent that it cannot be agitated rapidly. Interpolymers that have little or no affinity for water and do not swell to any measurable degree, are not suitable for the purposes of the present invention.

While the unneutralized crosslinked interpolymers are preferred, it is possible to employ partially or lightly neutralized interpolymers as dispersants in making the spherical particles in this invention. This partial neutralization can be accomplished by adding to the interpolymer, a sufficient amount of an ordinary monovalent alkali, such as sodium hydroxide, potassium hydroxide, ammonium hydroxide, and the like. The amount of neutralization that can be tolerated and still obtain the desirable and beneficial results will be in the range of about 0.0% to about 5.0% by weight, based upon the weight of the dispersant.

In addition to the crosslinked interpolymers, just described, which act as dispersion stabilizers, there are employed at least one other surfactant in conjunction therewith. For example, polyethylene oxide containing or oil soluble non-polyethylene oxide containing surfactants may be used with the crosslinked dispersant. This invention will be described where both a polyethylene oxide containing surfactant and a non-polyethylene oxide containing surfactant are used. The function of the surfactants is to increase the porosity of the polymer particles and, particularly, to increase the colloidal stability of the polymerization mixture. The use of the crosslinked polymeric dispersant and the surfactants, in conjunction with each other produces a very stable polymerization medium in which the tendency of monomer droplets to coalesce with each other is much less than when using either ingredient by itself. That is to say, a synergism is observed between the carboxyl group-containing crosslinked dispersants and some surfactants.

The amount of the water-insoluble substantially unneutralized crosslinked interpolymer useful as a colloidal stabilizer, or dispersant, in the process of making spherical resins of this invention will vary in the range of about 0.02 parts by weight to about 2.0 parts by weight, based on 100 parts by weight of the monomer or monomers being polymerized. Preferably, the amount used will be in the range of about 0.03 parts by weight to about 0.50 parts by weight per 100 parts by weight of monomer or monomers being polymerized.

The process of making spherical resins of the present invention is preferably conducted at a pH in the range of about 3.0 to about 4.3. Inasmuch as the dispersant is a substantially unneutralized crosslinked interpolymer of one or more carboxylic acid monomers, the polymerization reaction is conducted on the acid side.

With respect to the crosslinked polymeric dispersants used in making spherical resin, the carboxylic acid monomers utilizable in preparing the same are those which contain at least one active carbon-to-carbon double bond in the $\alpha,\beta$-position with respect to a carboxyl group such as

(1)

wherein R' is hydrogen or a —COOH group, and each of R" and R"' is a hydrogen or a monovalent substituent group which is linked to one of the doubly bonded carbon atoms. Carboxylic acids within this definition include acids, such as acrylic acid, wherein the double bond is terminal such as

(2)

or the dicarboxylic acids such as maleic acid and other anhydrides of the general structure

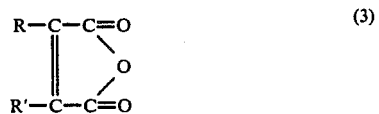
(3)

wherein R and R' are monovalent substituent groups and especially those selected from the group consisting of hydrogen and halogen groups and alkyl, aryl, alkaryl, aralkyl, and cycloaliphatic radicals.

Included within the class of carboxylic acids, shown by generic formula (1) above, are widely divergent materials, such as the acrylic acids, such as acrylic acid itself, methacrylic acid, ethacrylic acid, α- and β-chloro and bromo-acrylic acids, crotonic acid, maleic acid, itaconic acid, and many others.

Polymerizable carboxylic anhydrides include any of the anhydrides of the above acids, including mixed anhydrides, and those shown by generic formula (3) above, including maleic anhydride and others. In many cases it is preferred to copolymerize an anhydride monomer with a comonomer, such as methyl vinyl ether, styrene, ethylene, and the like.

It is preferred to employ polymeric dispersants which are derived from polymers produced by the polymerization of the α,β-monoolefinically unsaturated carboxylic acids. The preferred carboxylic acids are those derived from the acrylic acids and o-substituted acrylic acids having the general formula

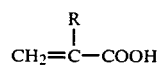

wherein R is a monovalent substituent selected from the group consisting of hydrogen, halogen, hyroxyl, carboxyl, amide, ester, lactone, and lactam.

The most preferred polymeric dispersants are those prepared from the lightly crosslinked interpolymers of acrylic acid. These dispersants are the most efficient.

The crosslinking agents which may be employed with any of the carboxylic monomers, or mixtures thereof, may be any compound, not necessarily monomeric in nature, containing two or more terminal polymerizable $CH_2=C<$ groups per molecule. Examples of this class of materials include polyunsaturated-hydrocarbons, -polyethers, -polyesters, -nitriles -acids, -acid anhydrides, -ketones, -alcohols and polyunsaturated compounds of this class incorporating one or more of these and other functional groups. Specifically, there may be utilized divinyl benzene, divinyl naphthalene, low-molecular weight and soluble polymerized dienes, such as polybutadiene and other soluble homopolymers of open chain aliphatic conjugated dienes, which soluble polymers do not contain any appreciable number of conjugated double bonds, and other polyunsaturated hydrocarbons; polyunsaturated esters, ester-amides and other ester derivatives, such as ethylene glycol diacrylate, ethylene glycol dimethacrylate, allyl acrylate, methylene bisacrylamide, methylene bismethacrylamide, triacrylyl triazine, hexallyl trimethylene trisulfone, and many others; polyunsaturated ethers, such as divinyl ether, diallyl ether, dimethyl allyl ether, diallyl ethylene glycol ether, diallyl, triallyl and other polyallyl ethers of glycerol, butene-1,2-diol, 1-phenyl-1,2,3-propanetriol, the polyallyl, -vinyl and -crotyl polyethers containing from two to seven or more of these or other alkenyl ether groupings per molecule and made from polyhydric alcohols, such as the carbohydrate sugars, and the so-called "sugar alcohols", including erythritol, pentaerythritol, arabitol, iditol, mannitol, sorbitol, inositol, raffinose, glycose, sucrose, and many others, and other polyhydroxy carbohydrate derivatives, the corresponding polyalkenyl silanes, such as the vinyl and allyl silanes; and others. Of this large class of crosslinking agents the polyalkenyl polyethers of the carbohydrate sugars, sugar alcohols and other polyhydroxy carbohydrate type derivatives containing from two to seven alkenyl ether groups per molecule are particularly useful. Such materials are easily prepared by a Williamson-type synthesis involving the reaction of an alkenyl halide, such as allyl chloride, allyl bromide, methallyl chloride, crotyl chloride, and the like, with a strongly alkaline solution of one or more of the poly-hydroxy carbohydrate derivatives.

In the monomeric mixture, for making the crosslinked polymers employed as colloidal stabilizers in the suspension polymerization process used in this invention, the two essential monomeric materials should be present in certain proportions, although the exact proportions will vary considerably depending on the characteristics desired in the polymer. Small amounts of the polyalkenyl polyether copolymerize quite readily with carboxylic monomers and the crosslinking effect of the polyalkenyl polyether on the carboxylic monomer is so strong that as little as 0.1% by weight thereof, based on the weight of the total mixture, produces a great reduction in the water and solvent-solublity of the resulting crosslinked polymer. When 0.1% to 4.0%, more preferably 0.20% to 2.5%, by weight of the polyether is utilized, water-insoluble polymers are obtained, especially with acrylic acids, which are extremely water sensitive. Useful dispersants are also obtained when 0.1% to 6.0%, and preferably 0.2% to 5% of the polyether is copolymerized with maleic anhydride. In the dual copolymer, or two-compound interpolymer, this means that the remainder of the monomeric mixture will be the carboxylic monomer.

The monomeric proportions employed in the production of multi-component interpolymers may vary in a somewhat similar manner. However, it is generally desirable to utilize as much of the carboxylic monomer or monomers and as little of the other monomeric constituents as is consistent with the desired water-insolubility and other properties. In these interpolymers, therefore, the carboxyic monomer or monomers should never be less than 25%, and preferably not less than 40%, by weight of the total monomeric mixture. Multi-component interpolymers may be made from monomeric mixtures comprising from 25% to 95% of a carboxylic monomer, such as acrylic acid, 0.1% to 30% of a polyalkenyl polyether, such as a polyallyl polyether of sucrose, and 5.0% to 74.9% of an additional monomer or monomers. Preferred multi-component interpolymers are the tripolymers resulting from the polymerization of monomeric mixtures containing, respectively, from 40% to 95% by weight of acrylic acid, 0.20% to 2.5% by weight of polyallyl polyether, such as that of sucrose, and 4% to 59% of an additional monomer or monomers, such as maleic anhydride, N-methyl acrylamide, methyl vinyl ether, ethyl vinyl ether, n-butyl vinyl ether, and the like, and mixtures of maleic anhydride, a vinyl alkyl ether, such as vinyl methyl ether, and a polyallyl polyether, in which the sum of the moles of vinyl ether and polyallyl polyether is substantially equivalent to the molar quantity of maleic anhydride present. It should be borne in mind that in the above proportions, if a maximum amount of two of the monomers are utilized, that somewhat less than maximum amounts of the other monomers must be utilized.

Suitable for use as additional monomers in the production of multi-component interpolymers are monoolefinic vinylidene monomers containing one terminal $CH_2=C<$ group, such as styrene, the chloro and ethoxy-styrenes, etc., acrylamide, N-methyl-acrylamide, N,N-dimethyl acrylamide, acrylonitrile, methacrylonitrile, methyl acryate, ethyl acrylate, 2-ethylhexylacrylate, methyl methacrylate, vinyl acetate, vinyl benzoate, vinyl pydridine, vinyl chloride, vinylidene chloride, vinylidene chlorobromide, vinyl carbazole, vinyl pyrrolidone, methyl vinyl ether, ethyl vinyl ether, n-butyl vinyl ether, methyl vinyl ketone, ethylene, isobutylene, dimethyl maleate, diethyl maleate, and many others. In addition to the above monoolefinic monomers, many of the divinyl dialkenyl or other polyfunctional esters, amides, ethers, ketones, and the like, may be used in the production of multi-component interpolymers, especially those polyfunctional monomers which nominally function as crosslinking or insolubilizing monomers but which are easily saponified and hydrolyzed to additional hydroxyl, carboxyl and other hydrophilic groups. For example, an interpolymer of acrylic acid and divinyl ether is insoluble in water but upon standing gradually goes into solution probably due to hydrolysis and breaking of divinyl ether crosslinks. The presence of strong alkali or acid speeds dissolution. Spectroscopic analysis confirms the presence in the polymers of non-carboxylic hydroxyls. Similarly, diesters, such as diallyl maleate, ethylene glycol dimethacrylate, acrylic anhydride, betaallyloxy acrylate, and many others, are readily saponified or hydrolyzed by alkali or acid with the introduction of additional hydroxyl and/or carboxyl groups. Of the additional monomers, N-methyl acrylamide, methyl vinyl ether, ethyl vinyl ether and divinyl ether have been found particularly useful in the production of the substantially unneutralized crosslinked interpolymers for use as substantially water-insoluble dispersants in the suspension polymerization of vinyl monomers.

In the process of this invention other surfactants are preferably employed, along with the water-insoluble crosslinked polymeric dispersant. Among the surfactants that are satisfactory, include the water-soluble, polyether containing nonionic surfactants. Examples of polyether containing nonionic surfactants useful are those falling within the following generic classes: (1) polyoxyethylene alkylphenols; (2) polyoxyethylene alcohols; (3) polyoxyethylene esters of fatty acids; (4) polyoxyethylene alkylamines; and (5) polyoxyethylene alkylamides. As examples of surfactants in the above-named classes there may be named the following: polyoxyethylene (20) sorbitan monooleate, polyoxyethylene (20) sorbitan monolaurate, polyoxyethyene (20) sorbitan monopalmitate, polyoxyethylene (20) sorbitan monostearate, polyoxyethylene (40) stearate, polyoxyethylene (50) stearate, polyoxyethylene esters of mixed fatty and resin acids, polyoxyethylene (20) palmitate, polyethylene glycol monolaurate, polyethylene glycol monooleate, polyethylene glycol ricinoleate, polyethylene glycol monostearate, polyethylene glycol distearate, polyoxyethylene (25) stearate, polyoxyethylene (40) stearate, polyoxyethylene (25) castor oil, polyoxyethylene (52) castor oil, polyoxyethylene (9) laurate, polyoxyethylene (15) tallate, polyoxyethylene (9) lauryl ether, polyoxyethylene (12) lauryl ether, polyoxyethylene (23) lauryl ether, polyoxyethylene (6) tridecyl ether, polyoxyethylene (10) tridecyl ether, polyoxyethylene (10) oleyl ether, polyoxyethylene (20) oleyl ether, polyoxyethylene (50) oleyl ether, polyoxyethylene (15) cetyl stearyl ether, polyoxyethylene (20) stearyl ether, polyoxyethylene (30) stearyl ether, polyoxyethylene (8) tridecyl ether, polyoxyethylene (9) nonyl phenyl ether, polyoxyethylene (21) coconut ester, and the like, etc. The above compounds have a multiplicity of functional groups and accordingly a very large number of modifications is possible. Mixtures of said compounds can also be used.

Non-polyethylene oxide containing surfactants are preferably used together with a polyethylene oxide containing surfactant and the water-insoluble crosslinked polymeric dispersant. Suitable non-polyethylene oxide containing surfactants are those compounds from the sorbitan ester family or the glycerol ester or polyglycerol ester families, as well as the polyvinyl alcohols, which do not contain polyethylene oxide segments. As examples of such surfactants there may be named sorbitan trioleate, sorbitan tri-stearate, sorbitan monooleate, sorbitan monopalmitate, glycerol monooleate, glycerol monostearate, triglycerol monooleate, 72.5% hydrolyzed polyvinyl acetate, and the like.

The polyethylene-oxide containing surfactant is used at a level of from about 0.005 parts by weight to about 1.0 parts by weight per 100 parts by weight of monomer. Preferably, an amount of about 0.0075 parts by weight to about 0.5 parts by weight per 100 parts by weight of monomer is used. The non-polyethylene oxide containing surfactant is used at a level of from about 0.005 parts by weight to about 0.2 parts by weight per 100 parts by weight of monomer, preferably from about 0.02 parts by weight to about 0.1 parts by weight per 100 parts by weight of monomer.

The monomer-soluble or oil-soluble catalysts that may be used in the polymerization process of this invention are the alkanoyl, aroyl, alkaraoyl, and aralkanoyl diperoxides and monohydroperoxides, azo compounds, peroxy esters, percarbonates, and other free radical type catalysts. As examples of such catalysts, there may be named benzoyl peroxide, lauryl peroxide, diacetyl peroxide, cumene hydroperoxides, methyl ethyl ketone peroxide · diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, 5-butyl peroxyneodecanoate, di-normal propyl peroxydicarbonate, azo-bis isobutyronitrile, $\alpha,\alpha'$-azodiisobutyrate, 2,2'-azobis-(2,4-dimethyl valeronitrile), and many others. The particular free radical catalyst employed will depend upon the monomeric material(s) being polymerized, the molecular weight and color requirements of the polymer, the temperature of polymerization, etc. Insofar as the amount of catalyst employed is concerned, it has been found that an amount in the range of about 0.005 parts by weight to about 1.00 parts by weight, based on 100 parts by weight of the monomer or monomers being polymerized, is satisfactory. However, it is preferred to employ an amount of catalyst in the range of about 0.01 part by weight to about 0.20 part by weight based on 100 parts by weight of monomer(s).

The suspension polymerization process of this invention may be carried out at any temperature which is normal for the monomeric material to be polymerized. Preferably, a temperature in the range of about 25° C. to about 100° C. is employed. In order to facilitate temperature control during the polymerization process, the reaction medium is kept in contact with cooling surfaces cooled by water, brine, evaporation, etc. This is accomplished by employing a jacketed polymerization reactor wherein the cooling materials is circulated through the jacket throughout the polymerization reaction. This cooling is necessary since most all of the polymerization reactions are exothermic in nature. It is understood, of course, that a heating medium can be circulated through the jacket, if necessary.

To gain the improvements of reduced fines, reduced polymer scale buildup and good porosity it is important that the catalyst and secondary surfactants, if used, be maintained in the vinyl monomer layer during the pre-polymerization time when the polymerization ingredients are being charged to the reactor.

If the catalyst is added as such or as an aqueous emulsion, it will sink through the less dense layer of monomer and go into the thickened water layer in the bottom part of the reaction vessel. This is also true of the secondary surfactants which are heavier than the monomer. The secondary surfactants and catalyst emulsion droplets end up in the aqueous phase, external to the sterically stabilized monomer droplet and thus must diffuse through the protective colloid layer into each individual monomer droplet.

Applicants have unexpectedly found that the problem of keeping the catalyst and secondary surfactants in the monomer layer can be solved by the improved process of this invention. The secondary surfactants and catalyst are mixed with a suitable solvent to form a solution before being combined with other polymerization ingredients. If secondary surfactants are not used, then the catalyst is mixed with the solvent. When the secondary surfactants and catalyst are mixed with a solvent, the solvent should be such that it will be a mutual solvent for all the secondary surfactants and for the catalyst. Also, the solvent must have a density which is equal to or less than the vinyl chloride monomer. Vinyl chloride monomer has a density of 0.84 g/cc. The solvent must also not result in charge instability such as to upset the colloidal stability of the suspension.

An alternative procedure is to first premix the secondary surfactants with the vinyl chloride monomer before charging the mixture to the polymerization vessel and then adding the catalyst as a solution, wherein the solvent has a density equal to or less than vinyl chloride and will not result in colloidal instability.

Examples of suitable solvents are $C_2$ or higher alcohols such as ethyl alcohol, propyl alcohol, isopropyl alcohol, butyl alcohol, sec-butyl alcohol, tert-butyl alcohol, n-amyl alcohol, sec-n-amyl alcohol, hexyl alcohol, and the like. Although methanol is a solvent for the catalyst, it will not dissolve some of the secondary surfactants. Therefor, it is suitable only if it will dissolve all of the ingredients in the catalyst solution. If the catalyst alone is in the solution, then methanol is a suitable solvent. Also, hydrocarbon solvents such as hexane and the like are suitable solvents. The preferred solvent is iso-propyl alcohol. The selection of the solvent is not critical as long as it meets the three criteria of (a) mutual solvent for all materials in the catalyst solution (b) has a density equal to or less than the density of the monomer being polymerized and (c) does not result in colloidal instability.

The catalyst solution will normally have a total solids content of up to about 75%. Preferably the catalyst solution total solids is from about 10% to about 50%, more preferably from about 15% to about 30% total solids. The catalyst solution will have a density of less than 1.0 g/cc such that it will not sink into the water layer.

REACTOR CHARGING PROCEDURE

The polymerization reactor charging procedure of this invention is explained in the steps below.

(a) Charge water and thickening dispersant(s) to the polymerization vessel. The thickening dispersant(s) can be added as such but is preferably added as a concentrated mixture with water. The water and thickening dispersant(s) may be premixed before charging to the polymerization vessel. The charge water is preferably demineralized water.

(b) Agitate the water and thickening dispersant(s) until an emulsion is formed.

(c) Reduce or stop the agitation such that non turbulent flow is achieved.

(d) charge the monomer(s) to be polymerized to the reactor vessel such that said monomer floats on top of the emulsified thickened aqueous layer.

(e) Charge a solution comprising a solvent and the free radical catalyst and optionally the secondary surfactant(s) to the reactor. If the secondary surfactant(s) are not combined with the catalyst solution then they should have been premixed with the monomer before adding to the reactor.

(f) Allow the catalyst solution to diffuse through the monomer layer.

(g) Increase the agitation such that the entire polymerization medium is emulsified.

(h) Conduct the polymerization until the desired degree of polymerization is achieved.

An alternate charging method is to first add the monomer(s) to the reactor together with the solution containing the catalyst and secondary surfactant(s). The catalyst solution could, of course, be premixed with the monomer prior to adding to the reactor vessel, in which case agitation would not be necessary after adding to the reactor. This mixture is then agitated thoroughly. The thickened water, which had been previously made up by mixing the thickening dispersant(s) with water, is charged into the bottom of the reactor through a bottom entry port. Agitation is then re-started and polymerization conducted.

The polymer particles produced by the present invention should have an average diameter by weight greater than about 70 microns. Normally, the polymer particles will have an average diameter by weight less than about 1000 microns. Preferably, for most end uses, the polymer particles will have a diameter in the range of about 70 microns to about 500 microns, most preferably from about 100 microns to about 400 microns. Resins with an average particle size by weight less than 70 microns tend to be dusty and build up static easily such that they are less desirable for extrusion operations such as pipe making.

The resin particles produced by this invention are spherical in shape. A very good method to measure the spherical shape of resins is to determine the shape factor by optical procedures. The image of the particle is projected onto a flat surface to provide a two dimensional view. The shape factor of a particle is determined by inscribing and circumscribing the resin particles flat image with a circle. The ratio of the diameters of the inscribed circle to the circumscribed circle is the number known as the shape factor.

In the case of a perfect circle, the inscribed and circumscribed circles would have the same diameter and, therefore, the shape factor would be unity (1.0). The more near the shape factor is to 1.0 the more spherical the particle.

The shape factor of the resin particles made by this invention is greater than about 0.9, preferably greater than about 0.93, and more preferably greater than about 0.95.

Resin having particles with a high shape factor will have a higher bulk density than resin having particles with a lower shape factor assuming constant porosity and particle size. Very simply, spherical objects pack more tightly than do irregular objects. The resins produced by this invention preferably have a bulk density greater than 0.58 g/cc with the more preferred bulk density being greater than 0.62 g/cc, when used in rigid applications such as pipe and siding. For resins used in flexible applications, the bulk density is preferably greater than 0.50 g/cc. The lower bulk density for flexible applications resin is due to the higher porosity. The increased bulk density of spherical resins over non spherical resin results in increased shipping and storage efficiency, that is more pounds of resin can be stored or shipped in a given railcar volume. Also, with other factors being constant, the increased bulk density and spherical shape result in increased extruder output, meaning more end product such as pipe can be produced on a given piece of extrusion equipment.

The spherical resin particles made by this invention also have porosity of from about 0.05 cc/g to about 0.5 cc/g as measured using mercury porosimeter. Preferably the porosity is from about 0.1 cc/g to about 0.25 cc/g for rigid applications. For flexible applications, the porosity is preferably from about 0.25 cc/g to about 0.40 cc/g.

To further illustrate the present invention, the following specific examples are given, it being understood that this is merely intended in an illustrative and not a limitative sense. In the examples all parts and percents are by weight unless otherwise indicated.

EXAMPLE I

In this example, a control run was made using the teachings of U.S. Pat. No. 4,360,651. The catalyst and secondary surfactants were charged to the polymerization vessel as an aqueous emulsion having 40% solids. The polymerization recipe used was as follows:

| Ingredient | Parts by Weight |
| --- | --- |
| Vinyl Chloride | 100 |
| Water (demineralized) | 150 |
| Polyacrylic Acid Dispersant | 0.060 |
| Polyethylene Oxide Containing Secondary Surfactant[1] | 0.025 |
| Non-polyethylene Oxide Containing Secondary Surfactant[2] | 0.050 |
| Di-secondary Butyl Peroxydicarbonate | 0.030 |
| Bisphenol A | 0.040 |

[1]Polyoxyethylene (20) sorbitan monooleate
[2]Sorbitan monooleate

A 4200 liter stainless steel reactor equipped with agitation and cooling means was used. The polymerization was conducted at 57° C. until 80% conversion of monomer to polymer, then the reaction was short-stopped with Bisphenol A. The resin produced was then stripped of residual monomer and dried to a free flowing resin particle.

The reactor charging procedure used in this example was to first mix with agitation the water with the polyacrylic acid dispersant. The agitator was then turned off and the vinyl chloride monomer was charged to the reactor through a top port. This results in two clear layers, with the monomer phase floating on top of the aqueous phase. The aqueous emulsion containing the catalyst and secondary surfactants were then charged to the monomer phase through a top port and allowed to sit for five minutes. Agitation was then re-started and the polymerization was conducted.

EXAMPLE II

This example is presented to show the process of this invention whereby the catalyst and secondary surfactants are chargaed as an isopropyl alcohol solution. The polymerization recipe used was as follows:

| Ingredient | Parts by Weight |
| --- | --- |
| Vinyl Chloride | 100 |
| Water (demineralized) | 150 |
| Polyacrylic Acid Dispersant | 0.075 |
| Polyethylene Oxide Containing Secondary Surfactant[1] | 0.025 |
| Non-polyethylene Oxide Containing Secondary Surfactant[2] | 0.050 |
| Di-secondary Butyl Peroxydicarbonate | 0.027 |
| Isopropyl Alcohol | 0.230 |
| Bisphenol A | 0.040 |

[1]Polyoxyethylene (20) Sorbitan Monooleate
[2]Sorbitan Monooleate

The reaction in this example was run using the same procedure and reactor size as in Example I except the catalyst and secondary surfactants were added as an isopropyl alcohol solution instead of as an aqueous emulsion as was done in Example I.

EXAMPLE III

This example is presented to show an alternate method of practicing the invention. The procedure of this example is to first add the vinyl chloride monomer to the reactor together with the isopropyl alcohol solution containing the catalyst and secondary surfactants. This mixture was agitated for 15 minutes. The agitation is then stopped. The water and dispersant were previously premixed in another vessel outside of the reactor. The aqueous phase was then charged to the reactor through a bottom port. This results in two layers, a top vinyl monomer layer floating on a bottom aqueous layer. Agitation was then re-started and the polymerization conducted using the same reaction temperature, reactor size, and percent conversion as in Examples I and II.

The polymerization recipe used was as follows:

| Ingredient | Parts by Weight |
| --- | --- |
| Vinyl Chloride | 100 |
| Water (demineralized) | 150 |
| Polyacrylic Acid Dispersant | 0.060 |
| Polyethylene Oxide Containing Secondary Surfactant[1] | 0.025 |
| Non-polyethylene Oxide Containing Secondary Surfactant[2] | 0.050 |
| Di-secondary Butyl Peroxydicarbonate | 0.030 |
| Isopropyl Alcohol | 0.139 |
| Bisphenol A | 0.040 |

[1]Polyoxyethylene (20) Sorbitan Monooleate
[2]Sorbitan Monooleate

The resins produced by Examples I, II and III were tested for properties of particle size, porosity, and bulk density as well as for fines, The amount of fines were determined by the weight percent less than 75 microns as well as the population and volumn percent less than 52 microns. The results are shown in Table I.

TABLE I

| Test | Resin Produced by: | | |
|---|---|---|---|
| | Ex. I Control | Ex. II | Ex. III |
| Average Particle Size (Microns) | 202 | 231 | 214 |
| Porosity (cc/g)[3] | 0.151 | 0.197 | 0.190 |
| Apparent Bulk Density (g/cc)[4] | 0.630 | 0.609 | 0.632 |
| Wt. % Less than 75 Microns | 2.44 | 1.50 | 0.50 |
| Population % less than 52 Microns | 49.1 | 17.2 | 6.3 |
| Volumn % less than 52 Microns | 1.12 | 0.20 | 0.03 |

[3] measured according to ASTM D-2873
[4] measured according to ASTM D-1895

The above results show an improvement in the porosity when the catalyst is added as an isopropyl alcohol solution (Examples II and III) according to this invention. Also, a very large reduction in the amount of fines, that is small particles less than 52 microns in size, were achieved by this invention. The population percent less than 52 microns was reduced from 49.1% for the control (Ex. I) to 17.2% and 6.3%, respectively, for Examples II and III of this invention. The volumn percent less than 52 microns was also reduced from 1.12% for the control to 0.20% and 0.03%, respectively, for Examples II and III of this invention. The reduction in the amount of fines produced when following the process of this invention offers a significant advantage in the production of polyvinyl chloride. The fines are troublesome in that they create dust and tend to plug filters in equipment. The increase in porosity observed with this invention is an indication that more of the secondary surfactant is in the monomer phase as opposed to the aqueous phase.

The resins produced by all of the examples shown above were spherical in shape as evidenced by having an average shape factor greater than 0.9.

The polymer buildup on the walls of the reactor is also greatly reduced when using the process of this invention (Examples II and III) as compared to the control process of Example I. With the control process of Example I, the reactor must be cleaned after each polymerization batch. With the process of this invention, up to 7 polymerization batches can be run before cleaning is required.

The resins produced by this invention are useful for many purposes. They may be compounded with stabilizers, lubricants, plasticizers, fillers, colorants, and the like. The compositions may be extruded into pipe and house siding or calendered to make film and sheet products.

I claim:

1. A process for polymerizing vinyl chloride in a thickened aqueous medium comprising:
   (a) charging vinyl chloride to a polymerization vessel equipped with agitation and cooling means;
   (b) charging a solution comprising at least one catalyst, at least one solvent, and optionally at least one secondary surfactant, wherein said solvent has a density equal to or less than vinyl chloride and said catalyst solution has a density less than 1.0 g/cc;
   (c) agitating the vinyl chloride and the catalyst solution to thoroughly mix the ingredients;
   (d) reducing or stopping said agitation such that non turbulent flow is achieved;
   (e) charge thickened water to the polymerization vessel through a port near the bottom of the vessel, said water being previously mixed with at least one dispersant capable of thickening said water;
   (f) forming in the polymerization vessel a bottom layer of thickened water and a top layer of vinyl chloride;
   (g) increasing the agitation such that the entire polymerization medium is emulsified;
   (h) conducting the polymerization of the vinyl chloride to form porous spherical shaped polyvinyl chloride resin particles, wherein said spherical shaped particles have an average shape factor greater than about 0.9 and a porosity greater than about 0.05 cc/g;
   (i) removing the polymerized resin from the reaction vessel.

2. A process of claim 1 wherein the water thickening dispersant is a lightly crosslinked interpolymer of acrylic acid.

3. A process of claim 2 wherein said secondary surfactant is at least one surfactant selected from the group consisting of polyethylene oxide containing surfactant and non-polyethylene oxide containing surfactant.

4. A process of claim 3 wherein said secondary surfactant is a blend of a polyethylene oxide containing surfactant and a non-polyethylene oxide containing surfactant.

5. A process of claim 4 wherein said polyethylene oxide containing surfactant is polyoxyethylene (20) sorbitan monooleate.

6. A process of claim 5 wherein said non-polyethylene oxide containing surfactant is selected from the group consisting of sorbitan trioleate, sorbitan tristearate, sorbitan monooleate, sorbitan monopalmitate, glycerol monooleate, glycerol monostearate, and triglycerol monooleate.

7. A process of claim 1 wherein said solvent in (b) is selected from the group consisting of an alcohol having at least 2 carbon atoms and a hydrocarbon.

8. A process of claim 7 wherein said solvent is isopropyl alcohol.

9. A process of claim 1 wherein said catalyst solution comprises at least one solvent, at least one catalyst and at least one secondary surfactant.

10. A process of claim 1 wherein at least one of said secondary surfactant(s) is premixed with the vinyl monomer prior to being charged into the polymerization vessel.

11. A process of claim 1 wherein in (b) the catalyst solution containing catalyst, solvent and optionally at least one secondary surfactant are premixed with said vinyl monomer prior to being added to the polymerization vessel.

* * * * *